United States Patent

Humpert et al.

(10) Patent No.: US 8,729,417 B2
(45) Date of Patent: May 20, 2014

(54) METHOD OF MANUFACTURING A CURRENT TERMINAL FOR EMBEDDED POLE PART, AND POLE PART ITSELF

(75) Inventors: Christof Humpert, Willich (DE); Wenkai Shang, Ratingen (DE)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 13/354,761

(22) Filed: Jan. 20, 2012

(65) Prior Publication Data

US 2012/0234795 A1 Sep. 20, 2012

Related U.S. Application Data

(63) Continuation of application No. PCT/EP2010/004397, filed on Jul. 19, 2010.

(30) Foreign Application Priority Data

Jul. 20, 2009 (EP) .................................... 09009398

(51) Int. Cl.
*H01H 33/66* (2006.01)

(52) U.S. Cl.
USPC .......................................... 218/138; 218/118

(58) Field of Classification Search
USPC .................. 218/134–136, 137–138, 118–120
See application file for complete search history.

(56) References Cited

U.S. PATENT DOCUMENTS

| | | | |
|---|---|---|---|
| 4,527,028 A | 7/1985 | Luehring | |
| 4,618,749 A | 10/1986 | Bohme et al. | |
| 5,808,258 A * | 9/1998 | Luzzi | 218/136 |
| 6,335,502 B1 | 1/2002 | Kikukawa et al. | |
| 7,285,743 B2 * | 10/2007 | Martin | 218/138 |
| D556,696 S | 12/2007 | Ruemenapp | |
| D558,147 S | 12/2007 | Ruemenapp | |
| D558,149 S | 12/2007 | Ruemenapp | |
| 7,488,916 B2 * | 2/2009 | Muench et al. | 218/154 |
| 8,038,457 B2 * | 10/2011 | Hughes et al. | 439/181 |
| 8,056,226 B2 * | 11/2011 | Hughes et al. | 29/883 |
| 8,152,547 B2 * | 4/2012 | Hughes | 439/282 |

(Continued)

FOREIGN PATENT DOCUMENTS

| | | |
|---|---|---|
| DE | 2320744 A1 | 11/1974 |
| DE | 2610440 A1 | 9/1977 |

(Continued)

OTHER PUBLICATIONS

Notice of Allowance issued Oct. 10, 2013 in corresponding U.S. Appl. No. 13/354,713.

(Continued)

*Primary Examiner* — Truc Nguyen

(74) *Attorney, Agent, or Firm* — Buchanan Ingersoll & Rooney PC

(57) ABSTRACT

The present disclosure provides a method of manufacturing a current terminal for an embedded pole part, in which a vacuum interrupter is molded by an isolating coverage in a hot and pressure injection process, and such a pole part. At the position of the upper electric terminal at the fixed contact side of the vacuum interrupter, a pressure protecting element is placed into the mold, at least close to the upper part the fixed contact side of the vacuum interrupter and/or together with it, and the protecting element, the terminal and the vacuum interrupter are embedded by injection molding.

18 Claims, 3 Drawing Sheets

(56) References Cited

U.S. PATENT DOCUMENTS

| | | | |
|---|---|---|---|
| 8,309,872 B2 * | 11/2012 | Peter et al. ................... | 218/118 |
| 8,408,925 B2 * | 4/2013 | Borgstrom et al. ........... | 439/181 |
| 8,415,579 B2 * | 4/2013 | Muench et al. ............... | 218/154 |
| 2009/0200270 A1 | 8/2009 | Chen et al. | |
| 2010/0170774 A1 | 7/2010 | Einschenk et al. | |
| 2010/0246102 A1 | 9/2010 | Martin et al. | |

FOREIGN PATENT DOCUMENTS

| | | | |
|---|---|---|---|
| DE | 102007028205 A1 | 12/2008 | |
| DE | 102007041971 A1 | 3/2009 | |
| EP | 0485306 A1 | 5/1992 | |
| FR | 1428094 A | 2/1966 | |
| FR | 2628258 A1 | 9/1989 | |
| FR | 2920251 A1 | 2/2009 | |
| FR | 2925755 A1 | 6/2009 | |

OTHER PUBLICATIONS

International Search Report (PCT/ISA/210) issued on Sep. 21, 2010, by European Patent Office as the International Searching Authority for International Application No. PCT/EP2010/004397.

International Search Report (PCT/ISA/210) issued on Sep. 15, 2010, by European Patent Office as the International Searching Authority for International Application No. PCT/EP2010/004396.

B. Fenski et al., Vacuum interrupters and embedded poles for medium voltage, etz publication translated by ABB, Mar. 2007.

* cited by examiner

METHOD OF MANUFACTURING A CURRENT TERMINAL FOR EMBEDDED POLE PART, AND POLE PART ITSELF

RELATED APPLICATION

This application claims priority as a continuation application under 35 U.S.C. §120 to PCT/EP 2010/004397, which was filed as an International Application on Jul. 19, 2010 designating the U.S., and which claims priority to European Application 09009398.0 filed in Europe on Jul. 20, 2009. The entire contents of these applications are hereby incorporated by reference in their entireties.

FIELD

The present disclosure relates to a method of manufacturing a current terminal for an embedded pole part, in which a vacuum interrupter will be molded with an electric insulating housing by a hot and pressure injection process, and to such a pole part.

BACKGROUND INFORMATION

The embedding of vacuum interrupters in epoxy is a well tested technology. In this technique, the filling pressure is low and it will not cause damage to the vacuum interrupter. Furthermore, the force on the electric terminal is also not critical and no special fixation is needed. However, the filling time and curing time are relatively long.

Injection molding of thermoplastic material is used in this field of technology.

During the injection molding, the pressure in the cavity of the mould is very high during the filling and packing period. The vacuum interrupter will experience the very high pressure, and special attention should be paid to the metal cover area.

By using injective molding method with thermal plastic material instead of epoxy material to embed the vacuum interrupter inside the insulation material, the difference between these techniques is the pressure value applied to the insert. In general, in reactive epoxy molding situations, the pressure is from several bars to maximum 20-30 bars. At this pressure level, it will not result in high force and stress for the current connection and for the vacuum interrupters. Therefore, no special constructions are needed to protect the vacuum interrupters and also no special fixations are needed for the upper terminal. In this case, the filling time and curing time is relatively long.

In injection molding for vacuum interrupters, the maximum pressure could reach several hundred bars. The end metal cover of vacuum interrupters has a thickness of several millimeters which could not withstand such high pressure. At the same time, the resultant forces on the upper terminal are very high. Therefore, a very strong construction and fixation of the upper terminal in the cavity and protection for the end metal cover of vacuum interrupters are needed, in order to avoid deformation of it. In this case, due to the very high pressure, the filling and packing time is very short.

SUMMARY

An exemplary embodiment of the present disclosure provides a method for manufacturing an embedded pole part. The exemplary method includes embedding a vacuum interrupter in a hot process by injecting embedding material in a mould in which the vacuum interrupter is positioned. The exemplary method also includes placing, at a position of an upper electric terminal of the pole part at a fixed contact side of the vacuum interrupter, a pressure protecting element into the mould. The pressure protecting element is placed at least one of close to an upper part of the fixed contact side of the vacuum interrupter and touching the upper part of the fixed contact side of the vacuum interrupter chamber. In addition, the exemplary method includes embedding the pressure protecting element, the terminal and the vacuum interrupter by injection molding.

An exemplary embodiment of the present disclosure provides an embedded pole part which includes a vacuum interrupter embedded in a hot process by injected embedding material. The vacuum interrupter includes an upper electric terminal. The exemplary embedded pole part also includes a pressure protecting reinforcement element arranged at a position of the upper electric terminal of the vacuum interrupter for the embedding of the injection material. The pressure protecting reinforcement element is integrated into an embedding coverage of the pole part.

BRIEF DESCRIPTION OF THE DRAWINGS

Additional refinements, advantages and features of the present disclosure are described in more detail below with reference to exemplary embodiments illustrated in the drawings, in which.

DETAILED DESCRIPTION

Figure 1:
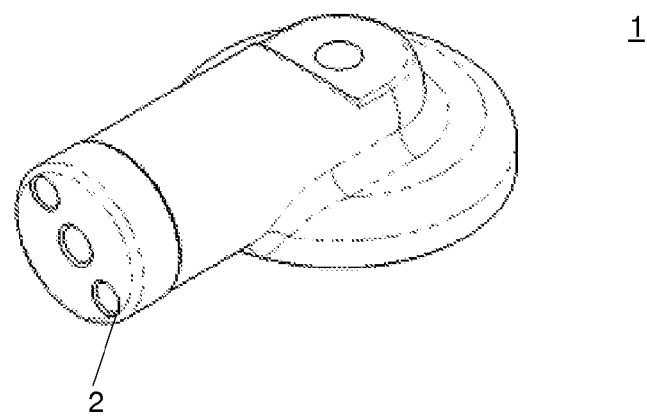
FIG. 1 shows a pressure protecting and/or heat distribution element used in conjunction with an exemplary embodiment of the present disclosure.
Figure 1:
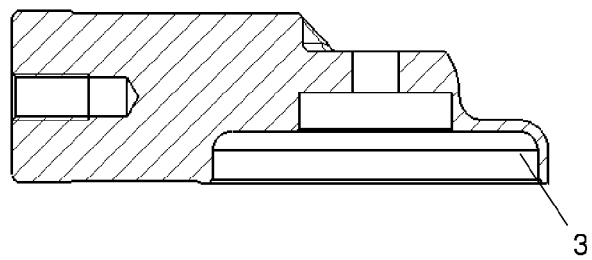

Exemplary embodiments of the present disclosure provide a method for manufacturing embedded pole parts (e.g., for medium voltage use), by which a vacuum interrupter chamber is embedded in a hot process by injecting embedding material in a mould in which the vacuum interrupter is positioned. Exemplary embodiments of the present disclosure also provide such a pole part.

Exemplary embodiments of the present disclosure provide that an upper current connection (terminal) which is fixed in a cavity. In addition, exemplary embodiments of the present disclosure provide that the vacuum interrupter metal cover is protected from mechanical deformation due to the very high pressure during the injection molding of thermoplastic material.

Exemplary embodiments of the present disclosure provide the following advantageous features for injective molding: (i) a protection method for the end metal cover of vacuum interrupters; and (ii) strong construction and fixation method of the upper connector in cavity.

These features are achieved, for example, by an exemplary method for manufacturing embedded pole parts (e.g., for medium voltage use), by which a vacuum interrupter chamber is embedded in a hot process by injecting embedding material in a mould in which the vacuum interrupter is positioned. In addition, the present disclosure provides such an embedded pole part.

In accordance with an exemplary embodiment of the present disclosure, at the position of the upper electric terminal of the vacuum interrupter, a pressure protecting element is placed into the mould, at least close to the upper part of the vacuum interrupter and/or together with it, and the protecting element and the terminal as well as the vacuum interrupter are embedded by injection molding in one step.

Accordingly, protection of the vacuum interrupter is provided as well as the integral molding of the electric terminals of the embedded poles in one further molding or thermoplastic injection process.

In accordance with an exemplary embodiment of the present disclosure, the pressure protecting element is used or implemented coincidentally as a heat distribution element.

In accordance with an exemplary embodiment of the present disclosure, the pressure protecting element is an integral part of the terminal, and is fixed at the upper part of the vacuum interrupter before inserting it completely into the mould.

In accordance with an exemplary embodiment of the present disclosure, the pressure protecting element is a separate part of the terminal. In a first step, the protecting element is fixed at the upper part of the vacuum interrupter. In a second step, the terminal is fixed at the upper part of the vacuum interrupter before inserting it completely into the mould.

According to this arrangement, the thus prepared vacuum interrupter will be fixed in the mould by fixing elements, which transmit the fixation forces only at the aforesaid terminal and/or the aforesaid protection element of the vacuum interrupter.

In accordance with an exemplary embodiment of the present disclosure, for quick handling in manufacturing, the fixation can be realized by clamshells, or bolts which are inserted from the backside of the terminal arrangement, and/or near the axis of the vacuum interrupter.

The present disclosure can be realized according to an integrated solution and a combined solution, which are described in more detail below.

The Integrated Solution:

In this solution, the current carrying part (e.g., the terminal) is made in such a way that it has the function of protecting the vacuum interrupter cover as shown in the drawings. The advantage is of this solution is that is provides a one part solution, the disadvantage is the cost. At least one of the fixation and different combinations of the fixation of this part could be used as shown in the drawings. The fixation could be, for example, by screw fixation or by inserting a cylinder into the part with corresponding holes. This part could be made by current conducting material such as, for example, copper, aluminum or an alloys thereof.

The Combined Solution:

In this solution, the current carrying part and the protection part are separated. The concept here is that these two parts are assembled in such a way that the force on the protection part is also overtaken by the current connection part and no direct force is transferred to the vacuum interrupter and this current connection part could be also fixed in the cavity in someway to avoid further deformation. The current carrying part could be made of, for example, copper, aluminum or alloys thereof. The protection part could be made from plastic material, copper material, metal material, etc., for example, which are dependent on particular application.

To fix the upper terminal in the cavity in both cases, the following solutions are possible:

Fixation by Screws:

In accordance with an exemplary embodiment of the present disclosure, the terminal has tapped holes, which are utilized to connect the resulting pole parts mounted on a circuit breaker with the switchgear. These holes can also be used to fix the upper terminal in the cavity. It is possible to screw the terminals directly in the cavity with threaded rods which are part of the complete mould. In another solution, special metal parts, which are formed, for example, like cylinders or cones, are screwed together with the terminals and then inserted in the cavity. Within the cavity, the metal parts are snapped in and fixed to the mould without clearance.

Fixation by Movable Fixing Elements:

In addition or alternatively to screwing it, the upper terminal can be fixed by additional elements integrated in the mould, which are moved back after cooling of the thermoplastic material. Examples for such movable elements are given in the following:

Fixation with an Additional Bolt from the Rear:

To fix the upper terminal in the mould, it is possible to use a bolt, which is moved into a corresponding hole at the backside of the terminal. This bolt will be moved back during or after the injection process.

The additional elements could by formed like a clamshell holding the terminal on the round part from three sides or like a shuck moved over the round part of the terminal.

Fixation with an additional bolt near the axial line of the vacuum interrupter in order to hold the upper terminal and vacuum interrupter in position.

The volume which gets free by moving back the fixing elements can be filled with thermoplastic material using, for example, a hot-channel system with a needle valve. It is also possible to fill this free volume during the injection molding process at the end of the filling process or during the packing process. At that time the inlay is stabilized by the hardened thermoplastic material, while near the gate, the thermoplastic material is fluid enough to enable the filling. In another solution, the remaining hole in the thermoplastic pole part is closed after the molding process by a plug, glued or welded together with the pole part.

Furthermore, it should be noted that the pressure protecting element, or the cap has an additional function, which is independent from its use as pressure protection use. This is the functionality of a heat distribution element.

FIG. 1 shows such a pressure protecting and/or heat distribution element 1. It is fixed as a cap on top of the vacuum interrupter 10. It forms a kind of a cap with an integrated electric terminal. The lower part of FIG. 1 once more shows it in a cut. From this it is seen that the element is a one piece element, which can be fixed as a cap on top of the vacuum interrupter. It covers the top of the vacuum interrupter 10 and protects it for the following thermoplastic high pressure and high temperature proceeding.

Figure 2:
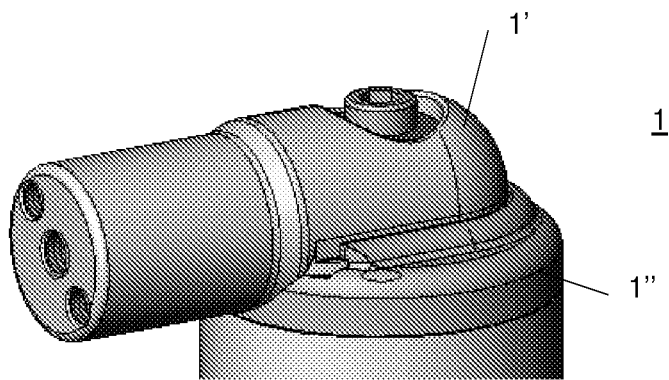
FIG. 2 shows a technique according to an exemplary embodiment of the present disclosure which is described hereinafter as a separate solution.
Figure 2:
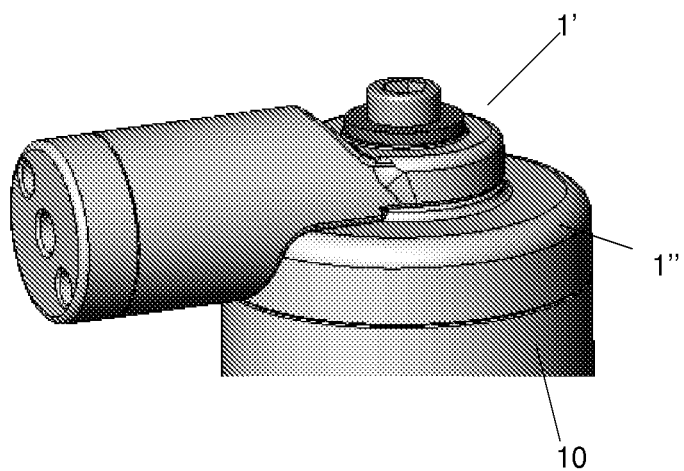

FIG. 2 shows the alternative of the so called separate solution. The current carrying part 1' and the protection part 1" are separated parts, mounted together on the vacuum interrupter. Accordingly, FIG. 2 shows two alternatives of this separate solution.

Figure 3:
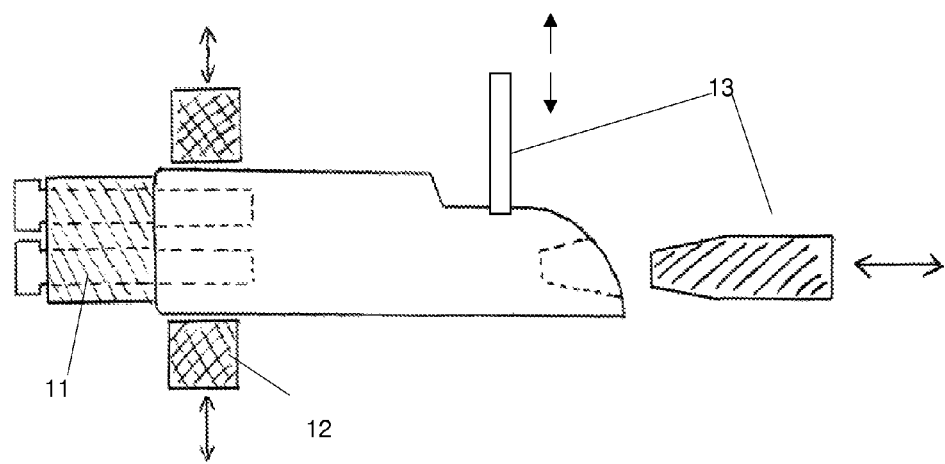
FIG. 3 shows an exemplary embodiment of the present disclosure in which an element is separately fixed into a mould.

FIG. 3 shows additional embodiments of the solution by separate fixation of the element 1 in the mould. First, an additional mould part 11 screwed to the electric terminal is used. Furthermore, or alternatively to part 11, the fixation could also be realized by a clampshell 12. A further fixation of the protection part 1 near to the vacuum interrupter in the mould could be a further bolt 13 which is inserted from the side or from on top into the part 1.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for manufacturing an embedded pole part, comprising:
    embedding a vacuum interrupter in a hot process by injecting embedding material in a mould in which the vacuum interrupter is positioned;
    placing, at a position of an upper electric terminal of the pole part at a fixed contact side of the vacuum interrupter, a pressure protecting element into the mould, the pressure protecting element being placed at an embedding coverage of the pole part at least one of close to an upper part of the fixed contact side of the vacuum interrupter and touching the upper part of the fixed contact side of the vacuum interrupter chamber; and
    embedding the pressure protecting element, the terminal and the vacuum interrupter by injection molding.

2. The method according to claim 1, wherein the pressure protecting reinforcement element is implemented as a heat distribution element.

3. Method according to claim 1, wherein the pressure protecting element is an integral part of the terminal, which is fixed at the upper part at the fixed contact side of the vacuum interrupter before inserting the pressure protecting element completely into the mould.

4. Method according to claim 1, wherein the pressure protecting element is a separate part of the terminal, and wherein the method comprises:
    fixing the pressure protecting element at the upper part at the fixed contact side of the vacuum interrupter; and
    after the pressure protecting element is fixed, fixing the terminal at the fixed contact side of the vacuum interrupter before inserting the terminal completely into the mould.

5. The method according to claim 2, wherein the vacuum interrupter is fixed in the mould by fixing elements, which transmit resulting forces only at at least one of the terminal and the pressure protection element of the vacuum interrupter.

6. The method according to claim 1, wherein the fixation is realized by at least one of clamshells and bolts which are inserted from at least one of a backside of an arrangement of the terminal and near an axis of the vacuum interrupter.

7. An embedded pole part comprising:
    a vacuum interrupter embedded in a hot process by injected embedding material, the vacuum interrupter including an upper electric terminal of the pole part at a fixed contact side of the vacuum interrupter; and
    a pressure protecting reinforcement element arranged at a position of the upper electric terminal of the vacuum interrupter for the embedding of the injection material, the pressure protecting reinforcement element being integrated into an embedding coverage of the pole part at least one of close to the upper electric terminal and touching the upper electric terminal, the embedding coverage of the pole part being subjected to embedding.

8. The embedded pole part according to claim 7, wherein the pressure protecting element is implemented as a heat distribution element.

9. The method according to claim 3, wherein the vacuum interrupter is fixed in the mould by fixing elements, which transmit resulting forces only at at least one of the terminal and the pressure protection element of the vacuum interrupter.

10. The method according to claim 9, wherein the fixation is realized by at least one of clamshells and bolts which are inserted from at least one of a backside of an arrangement of the terminal and near an axis of the vacuum interrupter.

11. The method according to claim 4, wherein the vacuum interrupter is fixed in the mould by fixing elements, which transmit resulting forces only at at least one of the terminal and the pressure protection element of the vacuum interrupter.

12. The method according to claim 11, wherein the fixation is realized by at least one of clamshells and bolts which are inserted from at least one of a backside of an arrangement of the terminal and near an axis of the vacuum interrupter.

13. The method according to claim 5, wherein the vacuum interrupter is fixed in the mould by fixing elements, which transmit resulting forces only at at least one of the terminal and the pressure protection element of the vacuum interrupter.

14. The method according to claim 13, wherein the fixation is realized by at least one of clamshells and bolts which are inserted from at least one of a backside of an arrangement of the terminal and near an axis of the vacuum interrupter.

15. The method according to claim 3, wherein the fixation is realized by at least one of clamshells and bolts which are inserted from at least one of a backside of an arrangement of the terminal and near an axis of the vacuum interrupter.

16. The method according to claim 4, wherein the fixation is realized by at least one of clamshells and bolts which are inserted from at least one of a backside of an arrangement of the terminal and near an axis of the vacuum interrupter.

17. The method according to claim 1, wherein the embedded pole part is configured for medium voltages.

18. The embedded pole part according to claim 7, wherein the embedded pole part is configured for medium voltages.

* * * * *